June 9, 1964

F. SINGER ETAL 3,136,234

PHOTOGRAPHIC SHUTTER

Filed April 17, 1962

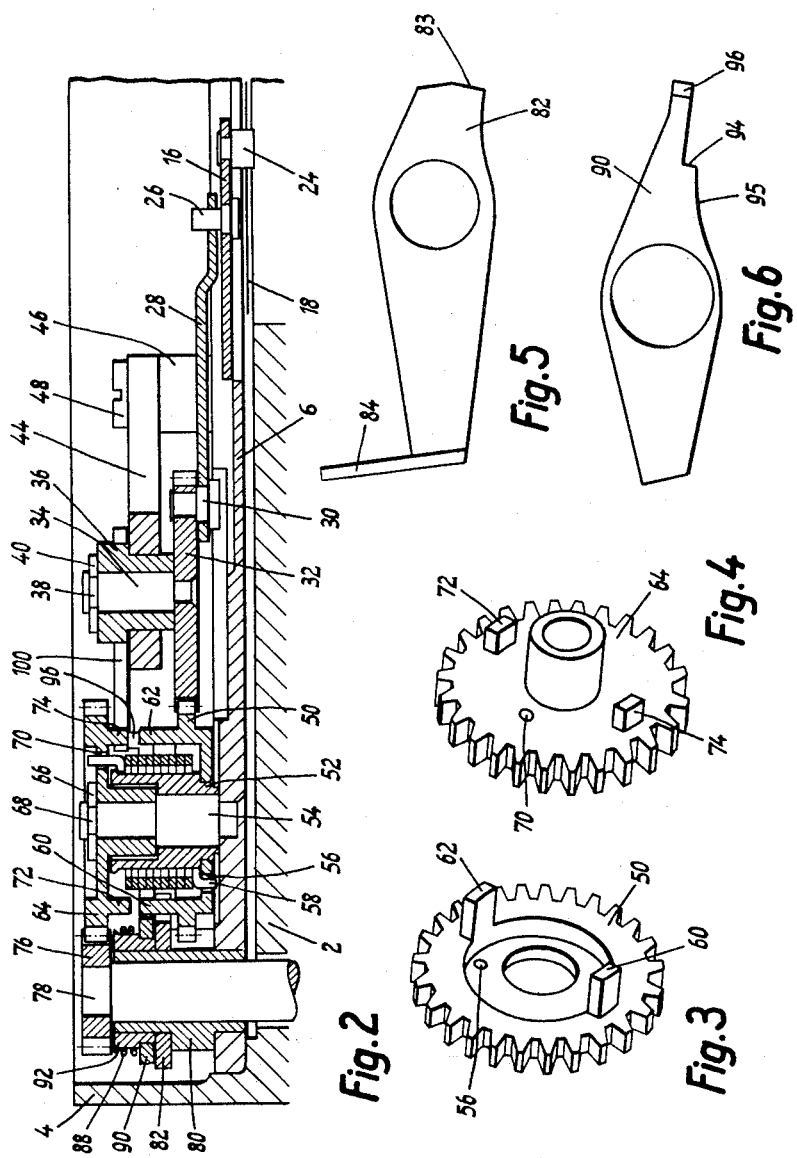

3,136,234
PHOTOGRAPHIC SHUTTER
Franz Singer, Bernhard Höhn, and Herbert Benninger, Munich, Germany, assignors to Compur-Werk G.m.b.H. & Co., Munich, Germany, a firm of Germany
Filed Apr. 17, 1962, Ser. No. 188,078
Claims priority, application Germany Apr. 25, 1961
10 Claims. (Cl. 95—63)

This invention relates to a photographic shutter, and more particularly to the means for driving the blade ring of the shutter in order to open and close the shutter blades.

An object of the invention is the provision of generally improved and more satisfactory shutter driving mechanism.

Another object of the invention is the provision of shutter driving mechanism which is particularly simple and compact, and which permits high shutter speeds to be attained without subjecting the shutter parts to major stresses.

Still another object is the provision of shutter driving mechanism in a simple and basic form which, with slight modification, can be adapted to operate a shutter of the normally closed type, in which the blades are opened only for making an exposure, or a shutter of the normally open type (such as used in a single lens reflex camera, for example) in which the blades are normally open so that the scene to be photographed can be observed on the focusing or viewfinding screen, and are then closed at the beginning of the exposure, opened and closed again for making the actual exposure, and opened again at the end of the exposure to restore the parts to viewing position.

A further object is the provision of improved mechanism for latching the parts of the shutter driving mechanism in various positions at various stages of operation.

These and other desirable objects may be attained in the manner disclosed as an illustrative embodiment of the invention in the following description and in the accompanying drawings forming a part hereof, in which:

FIG. 2 is a section taken approximately on the line II—II of FIG. 1;

FIG. 3 is a perspective view of a driving wheel forming part of the preferred construction;

FIG. 4 is a perspective view of a cocking or tensioning wheel forming part of the preferred construction;

FIG. 5 is a face view or plan of a main latching pawl which holds the driving wheel in tensioned position ready for making an exposure;

FIG. 6 is a similar face view or plan of a second or supplementary latching pawl for the driving wheel;

Figure 1:
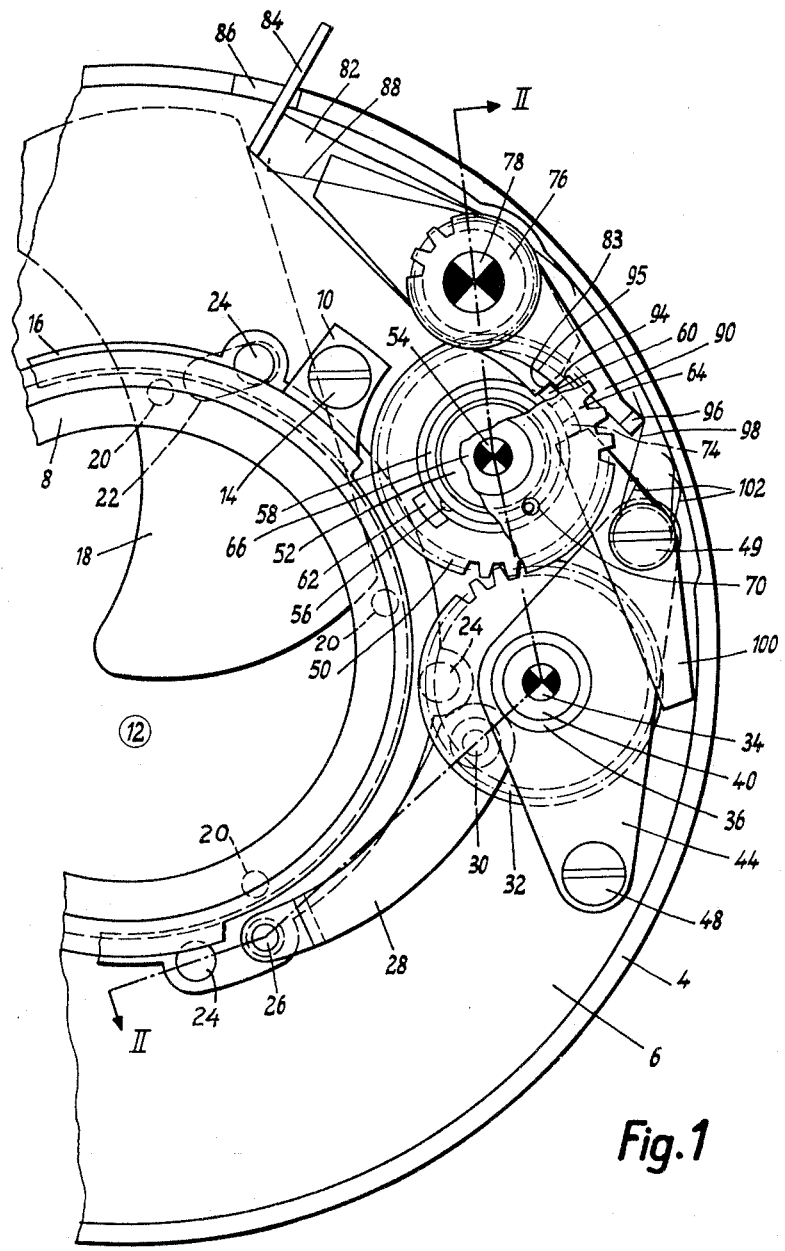
FIG. 1 is a fragmentary front face view of a photographic shutter in accordance with a preferred embodiment of the invention, with the front cover plate removed in order to show the parts beneath, and with various other parts omitted for the sake of clarity.

Referring first to FIGS. 1 and 2, the shutter in its preferred form comprises a housing or casing of the conventional annular kind, having a rear part or back wall 2 with a forwardly extending cylindrical marginal flange 4. A base plate or mechanism mounting plate 6 of annular form is mounted within the housing, and secured therein by any suitable means, such as screws. A front lens tube 8 projects forwardly from the mechanism plate 6, and has a series of radial lugs 10 secured by screws 14 to the base plate 6, so as to hold the lens tube centered in the shutter housing. The space 12 within the lens tube 8 constitutes the exposure aperture of the shutter, in a manner well understood by those skilled in this art. As usual, the optical axis of the shutter extends centrally through the aperture 12, in a direction perpendicular to the plane of the paper in FIG. 1.

The blade ring 16 rotates in the conventional manner about the optical axis as a center, conveniently bearing on an outer circular surface of the lens tube 8, and being held against axial displacement by the plate 6 to the rear of the blade ring and by a suitable shoulder on the lens tube in front of the blade ring. In the construction according to the present invention, the blade ring is oscillated by a driving rod or link connecting the blade ring to a crank pin on a uni-directional rotary member; that is, a rotary member which rotates always in a single direction, as distinguished from the more usual type of rotary "master member" which rotates in one direction during the making of an exposure and which rotates in the opposite direction while being cocked or tensioned ready for the next exposure. As the description proceeds, those skilled in the art will recognize that this provides a very versatile type of basic driving means, since it is adaptable with slight modification to either single ended shutter blades or double ended shutter blades, and either to a shutter which is normally closed and opened only for making an exposure, or to a shutter which is normally open for viewing and which is closed immediately prior to the exposure, then opened and closed for making the exposure, and then opened again for further viewing. The only modifications necessary for these various types of shutters, are simple modifications to determine whether the rotary driving member turns through half a revolution or through a full revolution at each operation, and to determine whether the stop position or rest position of the rotary driving member is at dead center position, or is at 90 degrees or quadrature position with respect to dead center.

Thus, for example, if single ended shutter blades of a normally closed shutter are to be used, the rest position or stop position of the rotary driving member should be at dead center, and the rotary driving member should operate through one complete revolution at each operation. The first half of the revolution, from the initial dead center position, will turn the blade ring in one direction, to open the blades. The second half of the revolution of the rotary driving member will turn the blade ring back in the opposite direction, to close the blades again, thus completing the exposure. If double ended or double lobe blades are to be used, still in a normally closed shutter, the rotary driving member should turn through one-half of a revolution at each exposure operation, and the two rest positions or stop positions of the rotary driving member should be the two dead center positions thereof. Thus the first half revolution, from the first rest position to the second rest position, will turn the blade ring through its full movement in one direction, moving the double ended blades from one closed position through open position to the second closed position, thus completing the exposure. Then when the next exposure is made, the rotary driving member will turn through the second half of its revolution, from the second rest position or dead center position to the first rest position or dead center position, rotating the blade ring in the opposite direction, and moving the double ended shutter blades back from their second closed position through open position to their first closed position, completing this exposure. Or again, if double ended shutter blades are to be used in a normally open type of shutter, where the blades are open to permit viewing both before and after the actual exposure (as in a single lens reflex camera) the rotary driving member should turn through one complete revolution at each operation, and the rest position or stop position should be at 90 degrees or at quadrature position with respect to dead center. With such an arrangement, when the rotary driving member is at its rest position the blade ring will be at the center of its range of movement, and the double ended blades will be open. The first quarter of a revolution of the rotary driving member will move the blade ring from its central position in a first direction to its extreme or limit position, thereby closing the shutter blades. The next half revolution of the driving member will move the blade ring back in a reverse or second direction through its full range of movement, thereby opening and closing the double ended blades in the conventional manner of operation of such blades, to make the exposure. The final quarter of a revolution of the driving member, back to its initial rest position, will move the blade ring through half of its range of travel in the first direction, opening the blades once more for viewing in the viewfinder, the film meanwhile being protected from fogging by movement of the reflex mirror or a special protective cover flap to effective protecting position, in the manner well known in the art.

A first example of these possibilities, now to be described in connection with FIGS 1-6, utilizes double ended blades in a normally closed type of shutter. Thus, in accordance with the above explanation, the rotary driving member turns through half a revolution at each operation, and each of its rest positions or stop positions is a dead center position with respect to the crank pin.

As usual, the shutter has any desired number of blades, about five blades being customarily used. One of these blades is shown at 18 in FIGS. 1 and 2, the others being omitted for the sake of clarity of the drawing. Each blade is a known form of double ended or double lobe blade, pivoted on one of the fixed pivots 20 spaced at equal intervals circumferentially around the exposure aperture 12. Each blade has the customary driving slot 22, in which is engaged one of the driving pins 24 spaced at equal intervals around the previously mentioned blade ring 16. In FIG. 1, the blade 18 is shown in its extreme clockwise position, the blade ring 16 also being in its extreme clockwise position, so that the first lobe or end of the blade 18, in combination with the corresponding ends of the various other blades overlapping with each other, will effectively close the exposure aperture 12. Those skilled in the art will understand that if the blade ring is now turned in a counterclockwise direction from this position, the various pins 24 on the blade ring, engaging in the various slots 22 of the various blades, will swing all of these blades in a counterclockwise direction on their respective pivots 20, so that the first ends or lobes of the blades will swing out of the exposure aperture 12 to open the exposure aperture fully, and then continued swinging in the same direction will cause the second ends or lobes of the respective blades to swing across the exposure aperture and overlap with each other to close the exposure aperture completely once more.

In addition to the blade operating pins 24, the blade ring 16 also has a driving pin 26, on which is pivoted one end of the driving rod or link 28, the other end of which is pivoted on the crank pin 30 riveted or otherwise secured to a crank wheel or rotary crank disk 32 riveted to a shaft or pin 34 which is rotatable in a bearing bushing 36. It is held against axial displacement in the bearing bushing by a split ring or C-clip 40 which clips removably into a circumferential groove 38 formed in the pin 34. The bearing bushing 36 is a tight press fit in a bridge plate 44, mounted on the mechanism mounting plate 6 but spaced therefrom by two spacing sleeves 46 at opposite ends of the bridge plate 44, and held by screws 48 and 49, respectively, extending through the spacing sleeves and screwed into the mounting plate 6.

The crank disk 32 could itself be directly driven by the power spring which furnishes the power for making an exposure, but usually it is more convenient to have the power spring connected to a separate rotary member operatively connected to the crank disk 32. For this reason, the periphery of the crank disk is provided with gear teeth which mesh with gear teeth on the periphery of a driving wheel or driving gear 50 riveted or staked to a bushing 52 which constitutes a hub for the member 50, this bushing being rotatable on a pivot pin or axle 54 which is riveted or otherwise suitably secured to the base plate 6. The wheel 50 has a bore or recess 56, in which is engaged one end of a coiled driving spring 58 which surrounds the hub 52, the opposite end of the driving spring being engaged in a bore or recess 70 in another rotary member 64 as further described below. The rotary driving member 50 also has two abutments 60 and 62 (see FIG. 3 especially) projecting from the upper face of the member 50, at diametrically opposite points, if this driving member is to make one-half of a revolution at each operation, as in the present embodiment.

Mounted rotatably on a reduced diameter portion of the pivot 54, as seen in FIG. 2, is a second rotary member or wheel 64 which may be called the tensioning or cocking member or wheel. This member 64 is held against axial displacement between a shoulder on the pivot 54 at the lower end of the hub of the member 64, and a spring clip or C-clip 66 which is sprung into a circumferential groove 68 near the upper end of the pivot 54. This wheel has a bore or recess 70 in which the second end of the driving spring 58 is engaged, as already mentioned, and it also has two abutments 72 and 74 projecting from its lower face at diametrically opposite points. The abutments 60 and 62 on the rotary member 50, and the abutments 72 and 74 on the rotary member 64, lie in different planes so that they may pass each other without making contact with each other.

The rotary member 64 has gear teeth on its periphery, meshing with the teeth of a tensioning or cocking pinion 76 which is fixed to a tensioning shaft 78 rotatable in a bearing bushing 80 which has a tight press fit in the base plate 6. The tensioning or cocking shaft 78 extends rearwardly from the shutter housing into the body of the camera on which the shutter is mounted, and is connected by conventional means (the details of which are not important for purposes of the present invention) to the tensioning mechanism of known form in the camera body, usually operated simultaneously with the mechanism for winding or feeding the film, as well understood in the art.

Rotatably mounted on a shoulder of the bearing bushing 80, there is a latching pawl 82 having an abutment surface or working edge 83 at one end for cooperation alternately with one or the other of the abutments 60 and 62 on the rotary driving member 50. The other end of the latching pawl 82 has an arm 84 which projects out through a slot 86 in the side wall flange 4 of the shutter housing, to an accessible position where it can be operated by finger pressure or by any suitable operating means mounted on the camera body, to trip or trigger the shutter for making an exposure. A light biasing spring 88 has one end bearing in a counterclockwise direction against the inner face of the flange 4 and the other end bearing in a clockwise direction on an edge of the latching pawl 82, to tend to turn the latching pawl in a clockwise direction. When the latching pawl 82 is at the clockwise limit of its motion (being the position shown in FIG. 1) the effective end 83 thereof is in a position to engage with one or the other of the abutments 60 and 62 on the rotary driving member 50, so as to prevent counterclockwise rotation of this rotary driving member.

Also mounted for rotation on the stationary bushing 80 is a second latching pawl 90 (see FIG. 6) which may be called the intercepting pawl or latch. Conveniently, the pawl 90 is riveted or staked to a bearing bushing 92 which rotates on the stationary bushing 80, and which has its upper end close to the bottom face of the pinion 76, thereby holding the pawls 82 and 90 against axial displacement on the bushing 80. The intercepting pawl 90 has a working edge or effective stopping edge 94, and to the left of this edge 94 there is a curved edge 95 which, under certain conditions, rides along the radially outward face of one or the other of the abutments 60 and 62 on the rotary member 50. A narrow portion or finger on the pawl 90 extends to the right from the working edge 94, as shown in FIG. 6, and at its extreme end is bent upwardly at 96 to bear against an edge of another pawl 100 to be described below. A biasing spring 98 is coiled around the head of the screw 49 and has one end bearing clockwise against the inner face of the flange 4 of the shutter housing, and its other end bearing counterclockwise against the upstanding end 96 of the pawl 90, thereby constantly tending to swing this pawl in a clockwise direction. Under the influence of this spring 98, the pawl 90 swings clockwise until its edge 95 rests against the radially outer face of one of the abutments 60 and 62, or until the upstanding end 96 bears against an edge of the third pawl 100.

This pawl 100, which may also be called an intercepting pawl or latch, rests on the upper face of the bridge plate 44 and is rotatable on and secured by the screw 49. It is urged in a counterclockwise direction by a biasing spring 102, one end of which reacts in a clockwise direction against the inner face of the flange 4 and the other end of which exerts counterclockwise pressure on an edge of the latch 100. The end face of the pawl when viewed from the direction of FIG. 1 is the effective working end or latching end of the pawl, whereas the opposite end (below the screw 49 when viewed as in FIG. 1) may engage the inner face of the upstanding flange 4 of the shutter housing, to limit the counterclockwise motion of the pawl. The effective end of the pawl cooperates with one or the other of the abutments 72 and 74 on the rotary tensioning member 64, to prevent clockwise rotation of the tensioning member.

The operation of this form of the shutter is as follows. Let is be assumed that the shutter has been cocked or tensioned since the last previous exposure, so that the parts are now ready for the next exposure, and let it be assumed that the crank pin 30 is in the dead center position in which the blade ring 16 is at the extreme clockwise limit of its motion, the exposure aperture being closed by the collective overlapping of the first ends or lobes of the respective shutter blades 18. The other parts will all be in the positions shown in FIG. 1, the main spring 58 will be wound or tensioned, and will be maintained in tensioned position because the pawl 100 is engaged with the abutment 74 to hold the wheel 64 against turning in a clockwise or spring-relaxing position, while the end 83 of the latch 82 is engaged with the abutment 60 to prevent the wheel 50 from turning in a counterclockwise or spring-relaxing direction.

When the exposure is to be made, the latching pawl 82 is deflected in a counterclockwise direction against the force of its biasing spring 88, and this removes the end 83 from the path of the abutment 60 on the driving wheel 50. The driving wheel can then begin to run down in a counterclockwise direction under the influence of the spring 58, thereby turning the other rotary driving member 32 in a clockwise direction, so that the crank pin 30 draws the connecting rod or link 28 to swing the blade ring 16 in a counterclockwise direction, swinging all of the shutter blades 18 in a counterclockwise direction on their pivots 20, to open the exposure aperture and then, as the motion continues, to close the aperture again by the action of the second ends or lobes of the double ended blades.

During the early part of the counterclockwise motion of the rotary driving member 50, the abutment 60 rides along the edge 95 of the intercepting pawl 90, but soon passes beyond this edge, whereupon the action of the spring 98 can turn this pawl slightly in a clockwise direction, bringing the effective abutment edge 94 thereof in a position ready to engage the second abutment 62 at the end of one-half revolution of the member 50. Since the other rotary driving member 32 has the same diameter as the member 50, it will turn to the same extent, so that when the member 50 is stopped at the end of one-half revolution by engagement of the abutment 62 with the shoulder 94 on the pawl 90, the member 32 will have completed one-half of a revolution and the crank pin 30 will be at its second dead center position, opposite to the position shown in FIG. 1. This is the run down position, or position of rest, which the parts assume at the completion of the exposure operation. But before reaching this position, during the half revolution of the rotary members 50 and 32, the motion of the crank pin 30 has caused first an acceleration and then a deceleration of the rotary motion of the blade ring 16, making the exposure in a smooth manner without undue strain on any of the shutter parts. Of course any conventional retarding mechanism may act on the blade ring or other appropriate part of the shutter mechanism, during the exposure, in order to time the duration of the exposure in a manner well understood in the art.

In order to cock or tension the shutter ready for the next exposure, the tensioning shaft 78 is turned in a clockwise direction by any suitable tensioning mechanism within the camera body, as already mentioned above. The pinion 76 on this shaft, in turning clockwise, causes counterclockwise turning of the tensioning wheel 64 which is geared thereto, thereby once more winding the spring 58 up to its tensioned position. During the counterclockwise tensioning motion of the member 64, the abutment 74 which was previously engaged with the end of the pawl 100 will move away from the end of the pawl, and the second abutment 72 will swing around to engage the edge of the pawl 100 and deflect the pawl in a clockwise direction on its pivot (against the force of its biasing spring 102) before the abutment 72 reaches the end of the pawl 100 and allows the pawl to snap back to its normal position behind the abutment 72. This momentary deflection of the pawl 100 in a clockwise direction causes it to engage the end 96 of the pawl 90 and deflect the pawl 90 in a counterclockwise direction, thereby swinging the operating shoulder 94 thereof away from the abutment 62 to allow the member 50 to turn very slightly in a counterclockwise direction, until the abutment 62 comes in contact with the working end or edge 83 of the latching pawl 82. Thus the parts are restored once more to a tensioned position ready for the next exposure, but the rotary parts 32, 50, and 64 are in positions one-half revolution away from the initial positions shown in FIG. 1, and the exposure aperture 12 is closed by the collective action of the second ends or lobes of the respective shutter blades 18, rather than the first ends or lobes thereof. During the next exposure, the action will be essentially the same as that previously described above, the rotary parts 50 and 32 turning through one-half revolution during the making of the exposure, except that this time the connecting rod or link 28 will start at the second dead center position and will move to the first dead center position, pushing the blode ring 16 through its range of travel in a clockwise direction rather than pulling it in a counterclockwise direction.

It will be observed from FIG. 1 that the effective edge 94 of the pawl 90 is slightly farther from the center of the shaft 78 than is the effective working edge 83 of the pawl 82. The purpose of having the second or supplementary pawl 90 is to insure that the rotary driving wheel 50 is stopped at the end of the desired extent of rotation, even though the operator has not meanwhile released the displacing pressure on the main latching pawl 82. Even though the pawl 82 is kept deflected until after the completion of the full exposure, the driving wheel 50 will be stopped at the proper point by the pawl 90. Then during the next tensioning or cocking operation, the pawl 90 will be rendered ineffective, and the rotary member 50 will once more be subjected to the control of the main latching pawl 82. The distance between the working edges 94 and 83 is very slight, and the rotary movement of the member 50 when released from the edge 94 and coming into contact with the edge 83 is so slight that it does not affect the position of the shutter blades.

As explained above, the construction can be easily modified in a very simple manner, to adapt it to use on a single lens reflex camera where the shutter blades are to be open for viewing (by means of a reflex mirror) both before and after the actual exposure. Basically, all that is really necessary in modifying the construction for this purpose is to provide only one abutment instead of two abutments on each of the rotary members 50 and 64, and to position the single abutment on the rotary member 50 in such a position of orientation that the stopped position or rest position of the driving wheel 32 will be a position of quadrature of the crank pin 30, at 90 degrees to the dead center positions, rather than being stopped in one or another of the dead center positions.

Figure 7:
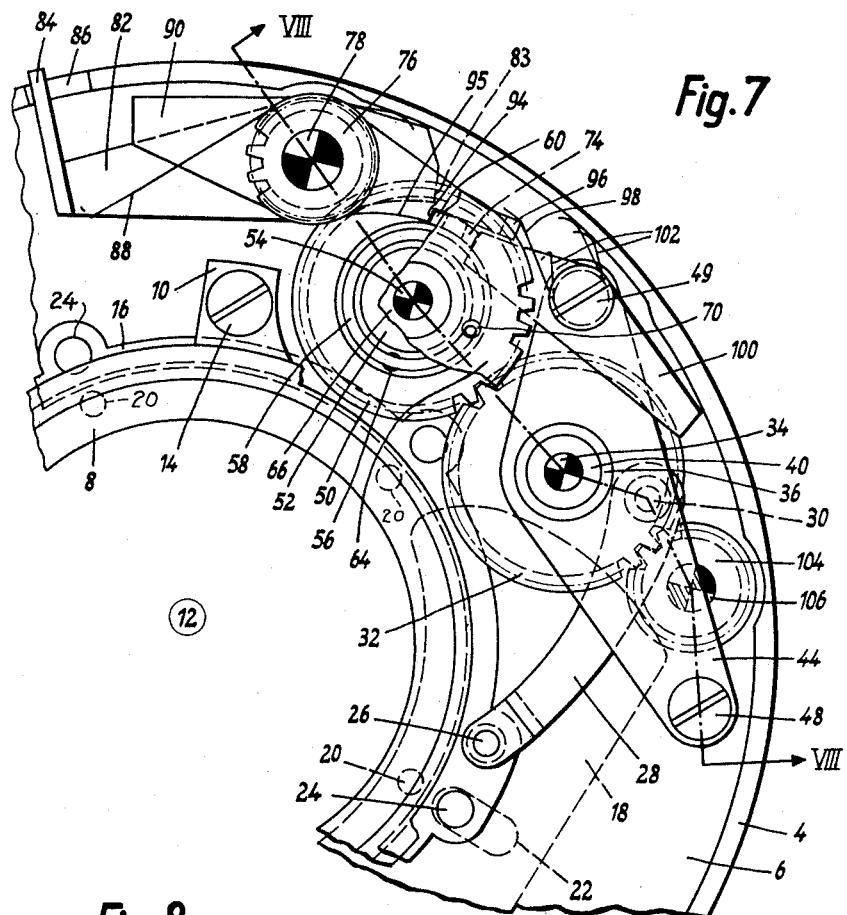
FIG. 7 is a view similar to FIG. 1, showing a modified construction.
Figure 8:
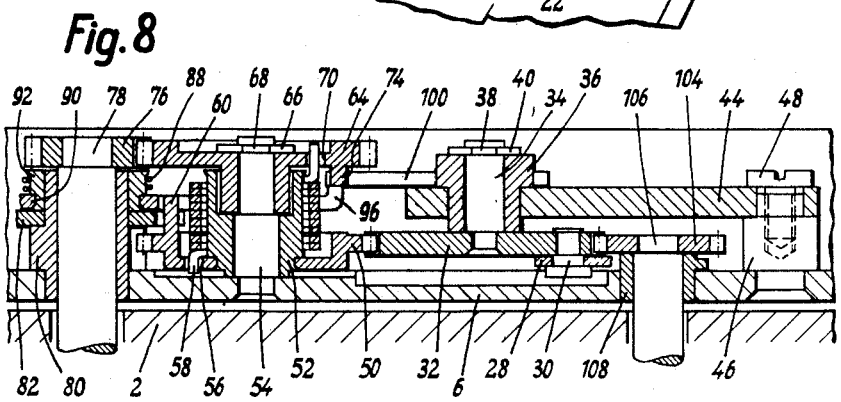
FIG. 8 is a section taken approximately on the line VIII—VIII of FIG. 7.

Such a construction is shown in FIGS. 7 and 8. Most of the parts are the same as previously described in connection with FIGS. 1–6, and carry the same reference numerals, so no special description of them is necessary. The abutment 62 on the member 50 is omitted, so that there is only the one abutment 60 on this member. Likewise the abutment 72 on the member 64 is omitted, so that there is only the one abutment 72 on this member. As just mentioned, the abutment 60 is so placed that when this abutment is engaged with the end 83 of the main latching pawl 82, the crank pin 30 will be in the quadrature position, and the blade ring 16 will be at the center of its range of travel, rather than in one or the other of the extreme positions.

It is desirable, moreover, to provide a pinion 104 meshing with the gear teeth on the crank disk 32, to be driven thereby. This pinion 104 is fixed to a shaft 106 which turns in a bushing 108 stationarily mounted on the base plate 6. The shaft 106 extends rearwardly into the body of the camera, where it controls the motion of the reflex viewing mirror and the protecting cover flap for the film, in known manner well understood in the art, the details of which are not important for purposes of the present invention so are not here illustrated.

FIGS. 7 and 8 illustrate the parts in the respective positions they occupy immediately at the conclusion of an exposure, before they are cocked or tensioned ready for the next exposure, and before the displacing pressure on the main latch 82 has been released. It is seen that the running down motion of the rotary driving parts 50 and 32 has been stopped by the supplementary pawl or intercepting pawl 90 in the position of quadrature, and the shutter blades are fully open to permit viewing in the viewfinder.

If the shutter is now tensioned ready for the next exposure, the counterclockwise tensioning movement of the member 64, caused by clockwise tensioning movement of the shaft 78 and pinion 76, will swing the abutment 74 in a counterclockwise direction, away from the end of the pawl 100 and then, almost at the end of one complete circle, back into engagement with the lateral edge of the pawl, swinging the pawl in a clockwise direction on its pivot 49, thereby engaging the part 96 of the pawl 90 to swing this pawl out of engagement with the abutment 60, which can then move very slightly in a counterclockwise direction, into engagement with the end 83 of the main latching pawl 82, which has meanwhile been restored to its normal latching position, of course. Then when the main latching pawl 82 is displaced to its released position for making the next exposure, the driving wheel 50 will turn through one complete revolution in a counterclockwise direction, and the driving crank disk 32 will turn through one complete revolution in a clockwise direction. The first quarter of a revolution will move the crank pin 30 from the quadrature position illustrated in FIG. 7, to the lower dead center position, closing the shutter blades, meanwhile turning the shaft 106 to move the camera flap and reflex mirror to a picture taking position, once the exposure aperture has been safely closed. The next half revolution of the member 32 will move the crank pin from the first or lower dead center position to the second or upper dead center position, moving the blade ring 16 through its full range of travel in a counterclockwise direction, opening the blades to make the exposure and then closing them again at the end of the exposure. Then during the last quarter of a revolution, the crank pin 30 will advance from its upper dead center position to its quadrature position shown in FIG. 7, once more opening the blades for viewing purposes, but meanwhile the action of the shaft 106 will, in known manner, have moved the film protecting flap in the camera to its protecting position and will have moved the reflex mirror to its viewing position. The movements of the shaft 106 will also, of course, control the movement of the diaphragm leaves to fully open position for viewing, at the completion of the exposure, and close them down to the preselected diaphragm aperture, just before the actual exposure, in a manner well understood by those skilled in the art, the details of which form no part of the present invention.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a unidirectionally rotatable driving wheel, shutter blades operatively connected to said driving wheel to be opened and closed by movement of said driving wheel, a unidirectionally rotatable tensioning wheel mounted substantially coaxially with said driving wheel, a driving spring operatively connected to both of said wheels to tend to turn them in opposite directions, a releasable main latching pawl for holding said driving wheel in a starting position against forward movement, an intercepting pawl for holding said driving wheel in an intermediate position slightly in advance of said starting position, a tensioning pawl for holding said tensioning wheel in tensioned position against reverse movement, said tensioning pawl being temporarily displaced by forward movement of said tensioning wheel from one tensioned position to a next succeeding tensioned position, and cooperating means on said tensioning pawl and said intercepting pawl for displacing said intercepting pawl to an ineffective position by the act of displacing said tensioning pawl as a result of forward movement of said tensioning wheel, so that at the conclusion of each forward tensioning movement of said tensioning wheel, said driving wheel will be held by said main latching pawl rather than by said intercepting pawl.

2. A photographic shutter comprising a blade ring movable rotationally through a limited range of movement, pivoted shutter blade means operatively connected to said blade ring to be moved thereby between open and closed positions, a driving wheel rotatable unidirectionally from one to another of successive starting positions and operatively coupled to said blade ring to open and close said blade means during each successive forward movement from one starting position to the next succeeding starting position, a spring operatively connected to said driving wheel to tend to turn it forwardly, a releasable latch for engaging said driving wheel to restrain it against forward movement beyond each successive starting position, an intercepting pawl for engaging said driving wheel during each successive forward movement from one starting position toward the next succeeding starting position to arrest such forward movement at an intermediate position slightly in advance of the next succeeding starting position, tensioning means operable to re-tension said spring after each successive forward movement of said driving wheel, and means operated by movement of said tensioning means during each re-tensioning operation thereof for disengaging said intercepting pawl so that said driving wheel may move slightly forwardly from said intermediate position to its next succeeding starting position.

3. A construction as defined in claim 2, in which said latch and said intercepting pawl are mounted coaxially for oscillation about a common axis, and in which said driving wheel has an abutment portion and said latch and said pawl each have an effective stop edge for engaging said abutment portion to stop movement of said driving wheel, the stop edge on said pawl being farther from said common axis than the stop edge on said latch.

4. A construction as defined in claim 2, in which the operative coupling between said driving wheel and said blade ring includes a crank pin driven by said driving wheel, a driving pin on said blade ring, and a connecting link pivotally mounted both on said crank pin and on said driving pin.

5. A construction as defined in claim 4, in which said blade ring is at one limit of its rotary movement when said crank pin is at one dead center position with respect to said driving pin and is at the opposite limit of its movement when said crank pin is at its second dead center position and is at approximately the center of its range of rotary movement when said crank pin is in a position of quadrature at 90 degrees to its dead center positions.

6. A construction as defined in claim 5, in which said driving wheel has two abutments at diametrically opposite positions for engaging said latch to determine successive starting positions of said wheel, said abutments being so placed on said driving wheel that each of the starting positions thereof will be substantially at a dead center position of said crank pin.

7. A construction as defined in claim 5, in which said driving wheel has an abutment for engaging said latch to determine a starting position of said wheel, said abutment being so placed on said driving wheel that in said starting position, said crank pin will be substantially at a dead center position.

8. A construction as defined in claim 5, in which said driving wheel has an abutment for engaging said latch to determine a starting position of said wheel, said abutment being so placed on said driving wheel that in said starting position, said crank pin will be substantially at a position of quadrature 90 degrees from a dead center position.

9. A photographic shutter comprising a base plate, pivoted shutter blade means, a blade actuating member movable with respect to said base plate and operatively connected to said blade means, a bridge plate spaced from and approximately parallel to said base plate, a crank member in the form of a gear wheel rotatably mounted on said bridge plate and rotating in a plane between said base plate and said bridge plate, a connecting link pivotally connected both to said crank member and to said blade actuating member for moving said blade actuating member from rotary movement of said crank member, and spring-powered unidirectional rotary driving means for driving said crank member always in the same rotary direction to a predetermined rotary extent for operating said blade actuating member to make an exposure, said rotary driving means including a spring powered driving gear wheel meshing with said crank gear wheel in driving relation thereto.

10. A construction as defined in claim 9, further including a reflex mirror control shaft geared to said crank gear wheel to be driven thereby.

References Cited in the file of this patent
UNITED STATES PATENTS
1,626,032    Fairchild _____ Apr. 26, 1927